Figure 2:
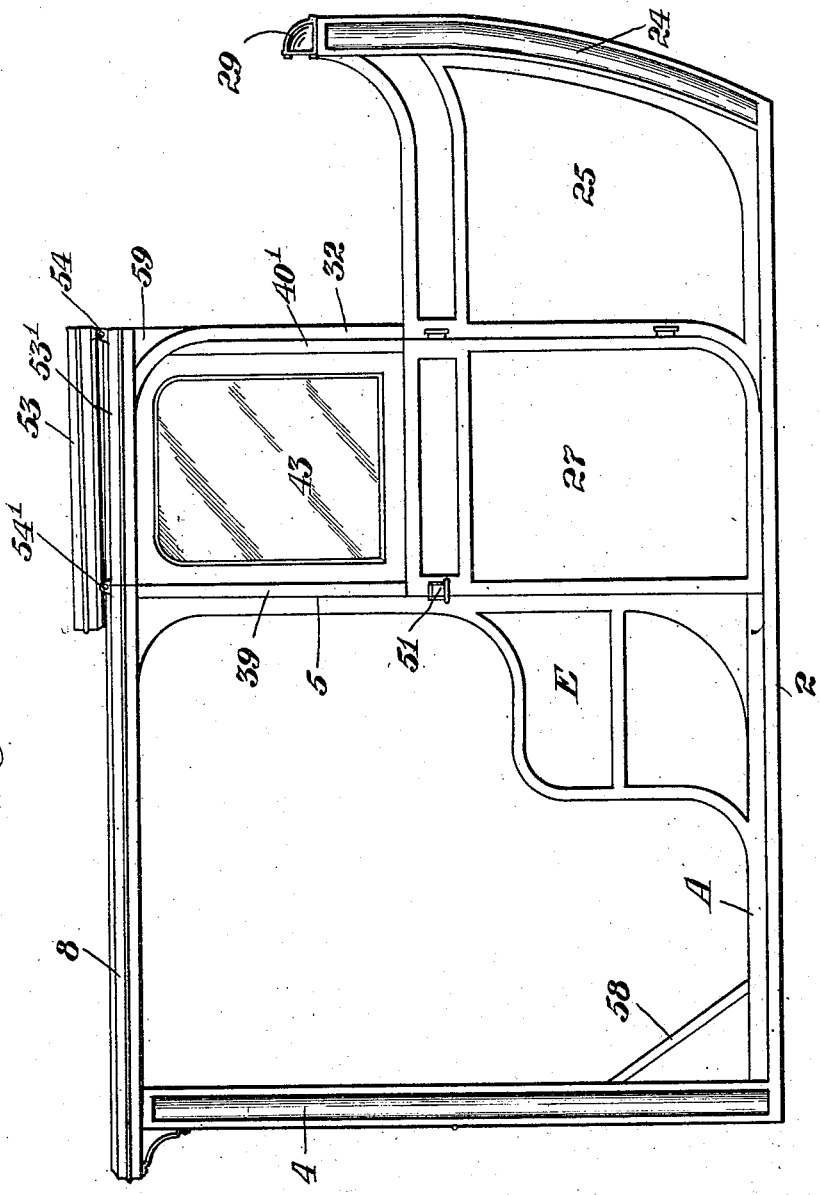

W. I. TWOMBLY.
COMBINATION CONVERTIBLE VEHICLE BODY.
APPLICATION FILED MAR. 4, 1910.

992,298.

Patented May 16, 1911.

9 SHEETS—SHEET 1.

Fig. 1.

WITNESSES:

INVENTOR
Willard I. Twombly

BY John O. Seifert.
ATTORNEY

W. I. TWOMBLY.
COMBINATION CONVERTIBLE VEHICLE BODY.
APPLICATION FILED MAR. 4, 1910.

992,298.

Patented May 16, 1911.
9 SHEETS—SHEET 2.

WITNESSES:

INVENTOR
Willard I. Twombly
BY
ATTORNEY

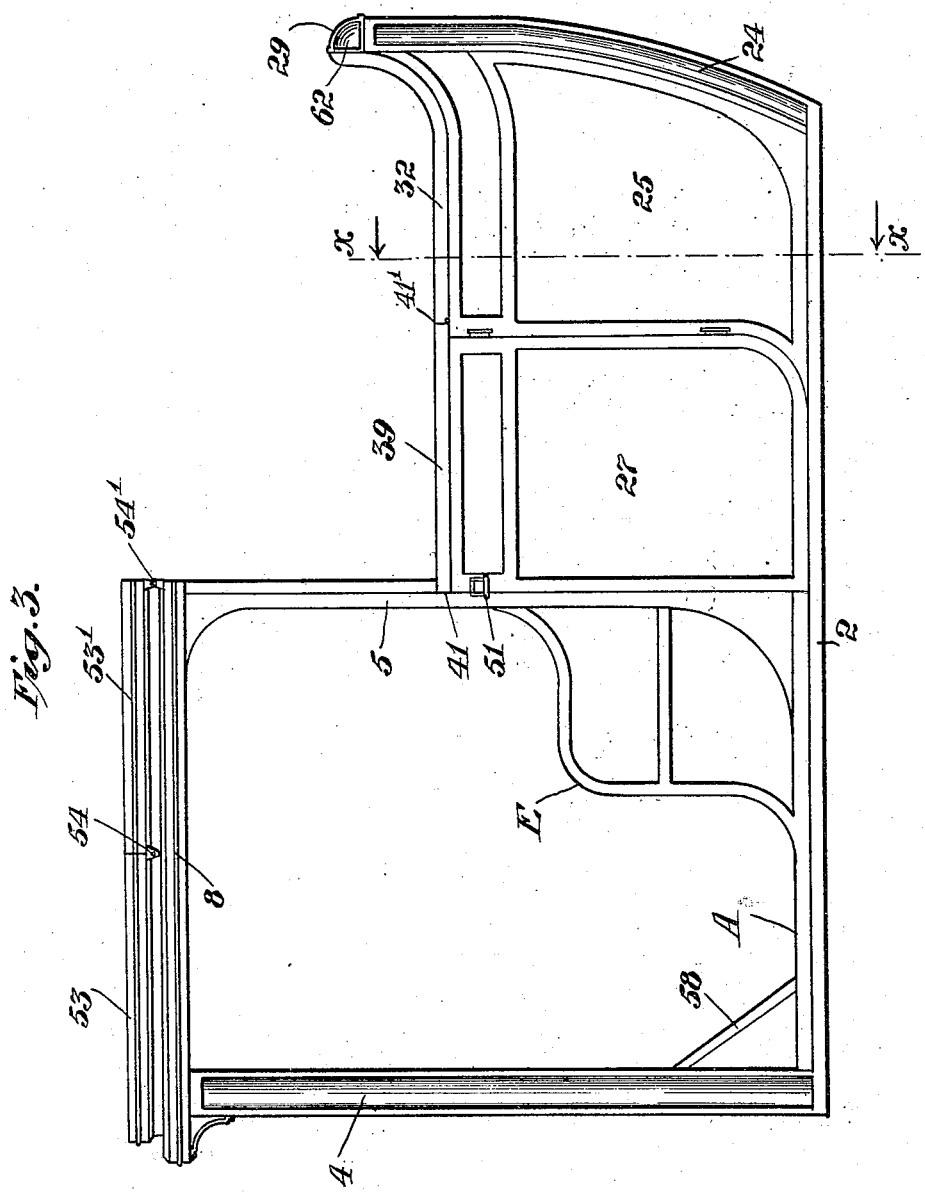

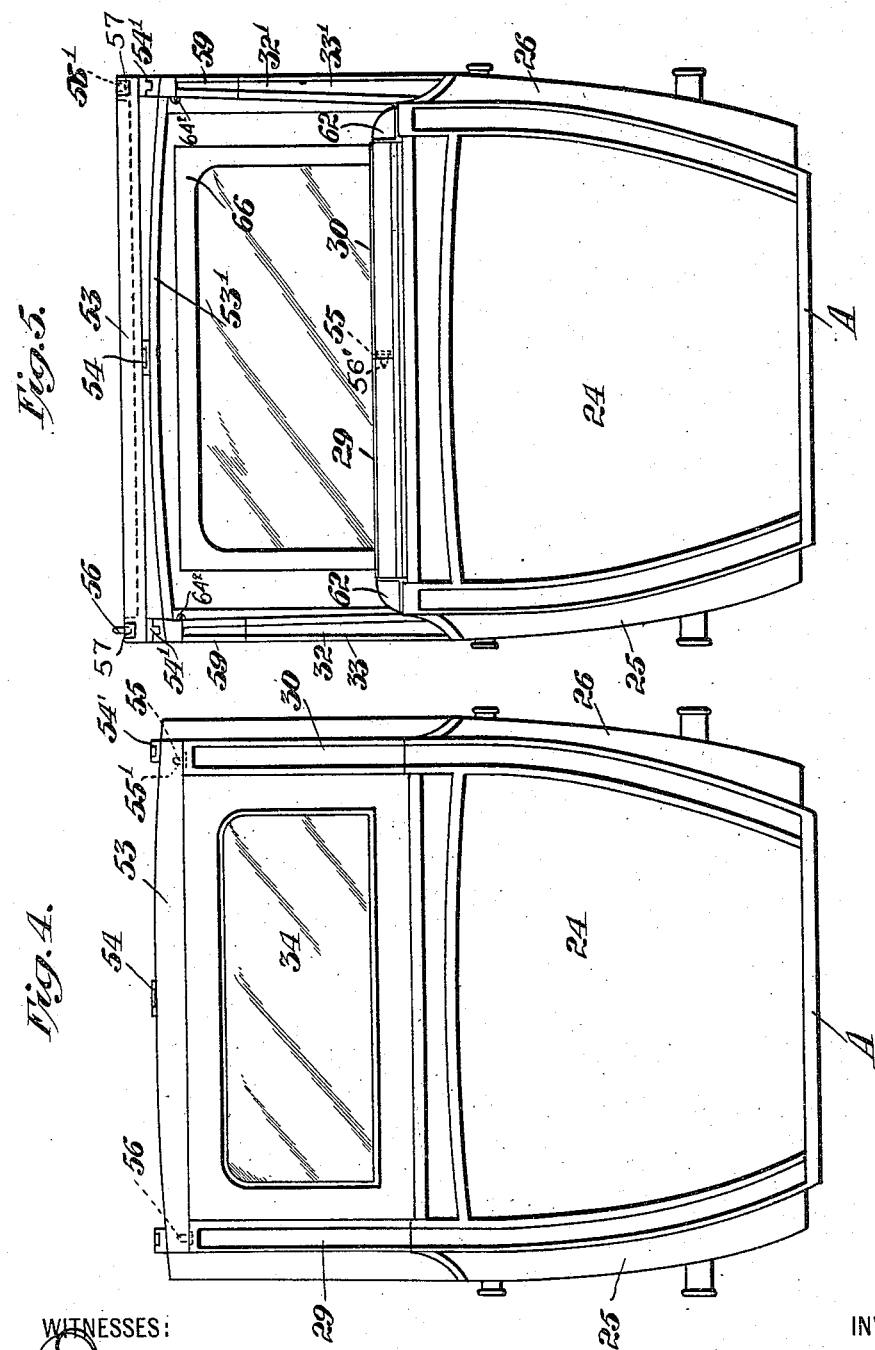

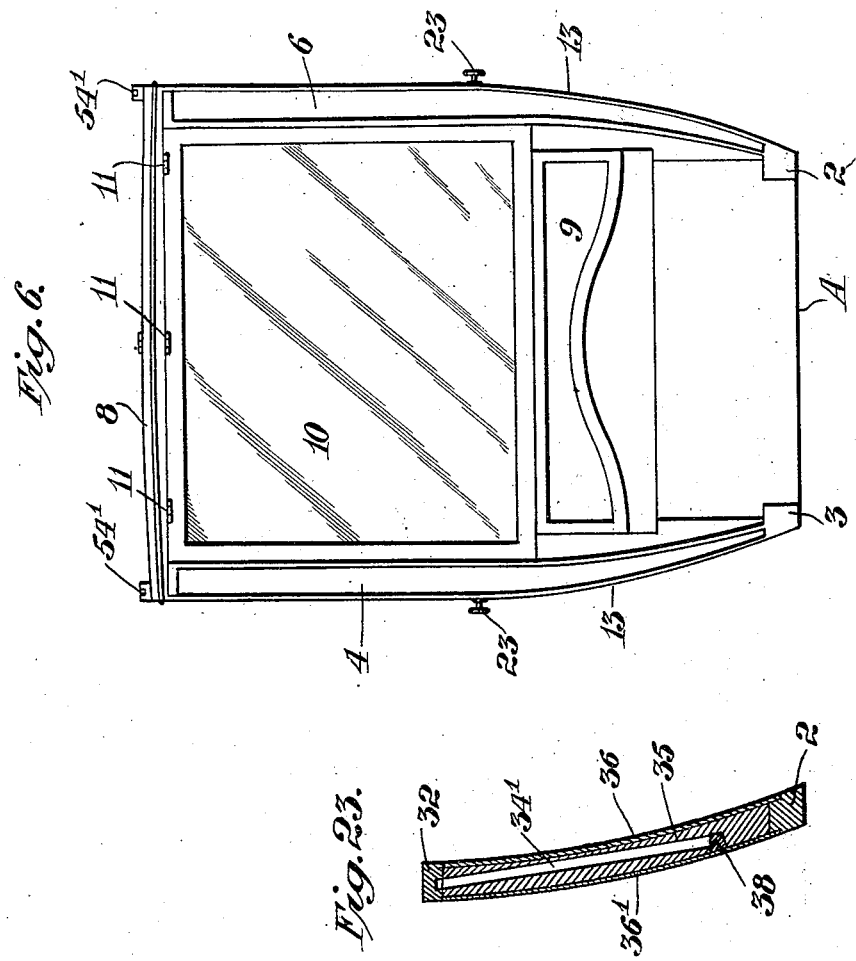

W. I. TWOMBLY.
COMBINATION CONVERTIBLE VEHICLE BODY.
APPLICATION FILED MAR. 4, 1910.
992,298.
Patented May 16, 1911.
9 SHEETS—SHEET 6.
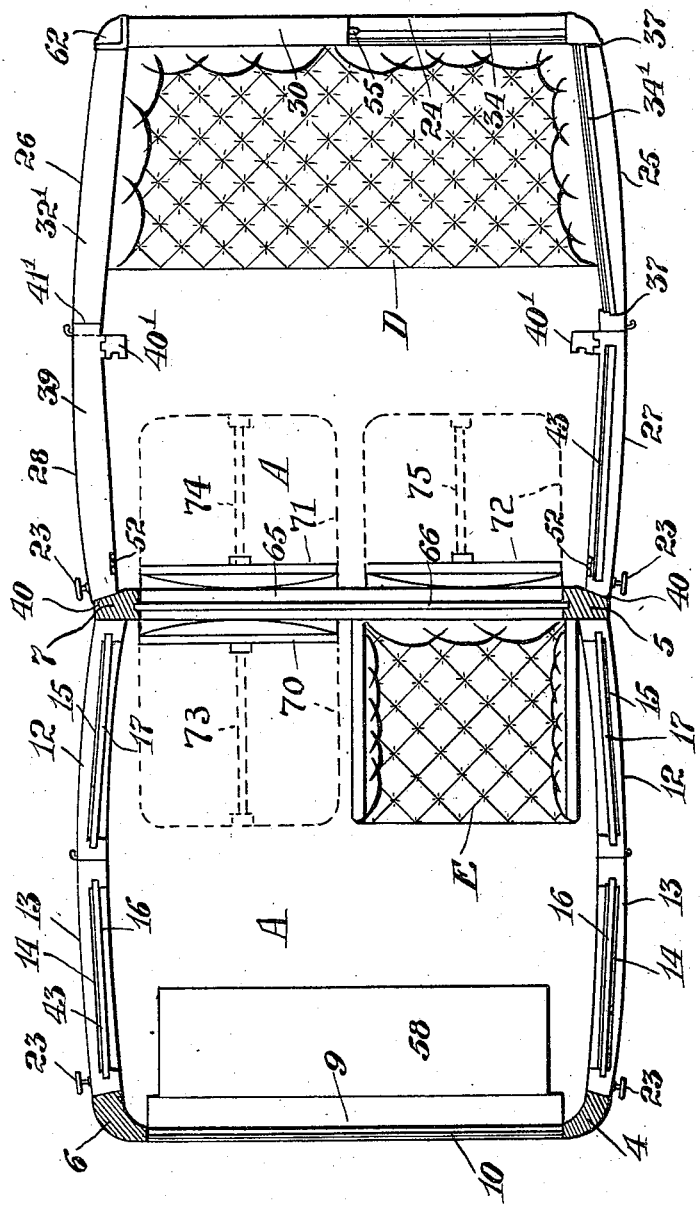
WITNESSES:
INVENTOR
Willard I. Twombly
BY
John O. Seifert
ATTORNEY

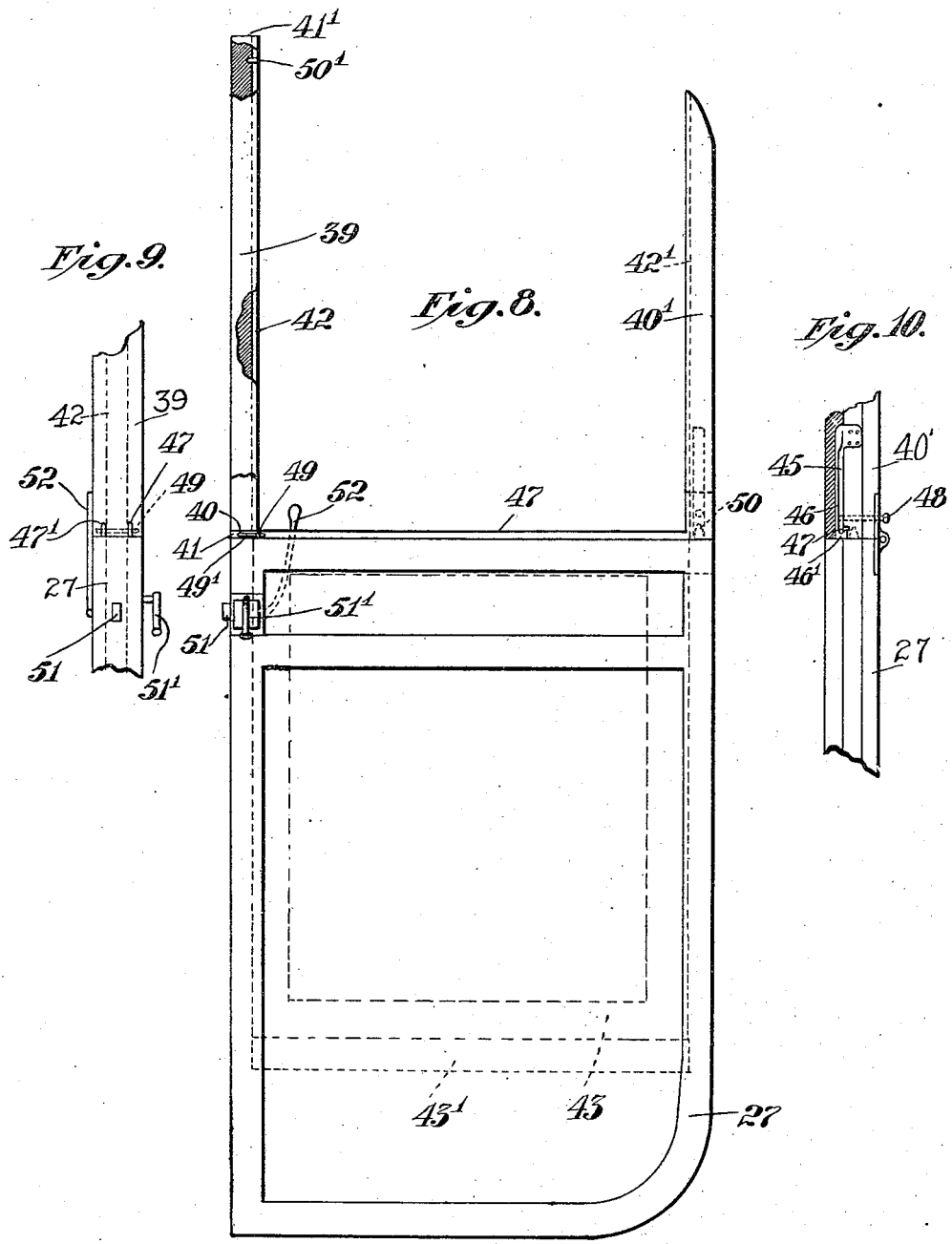

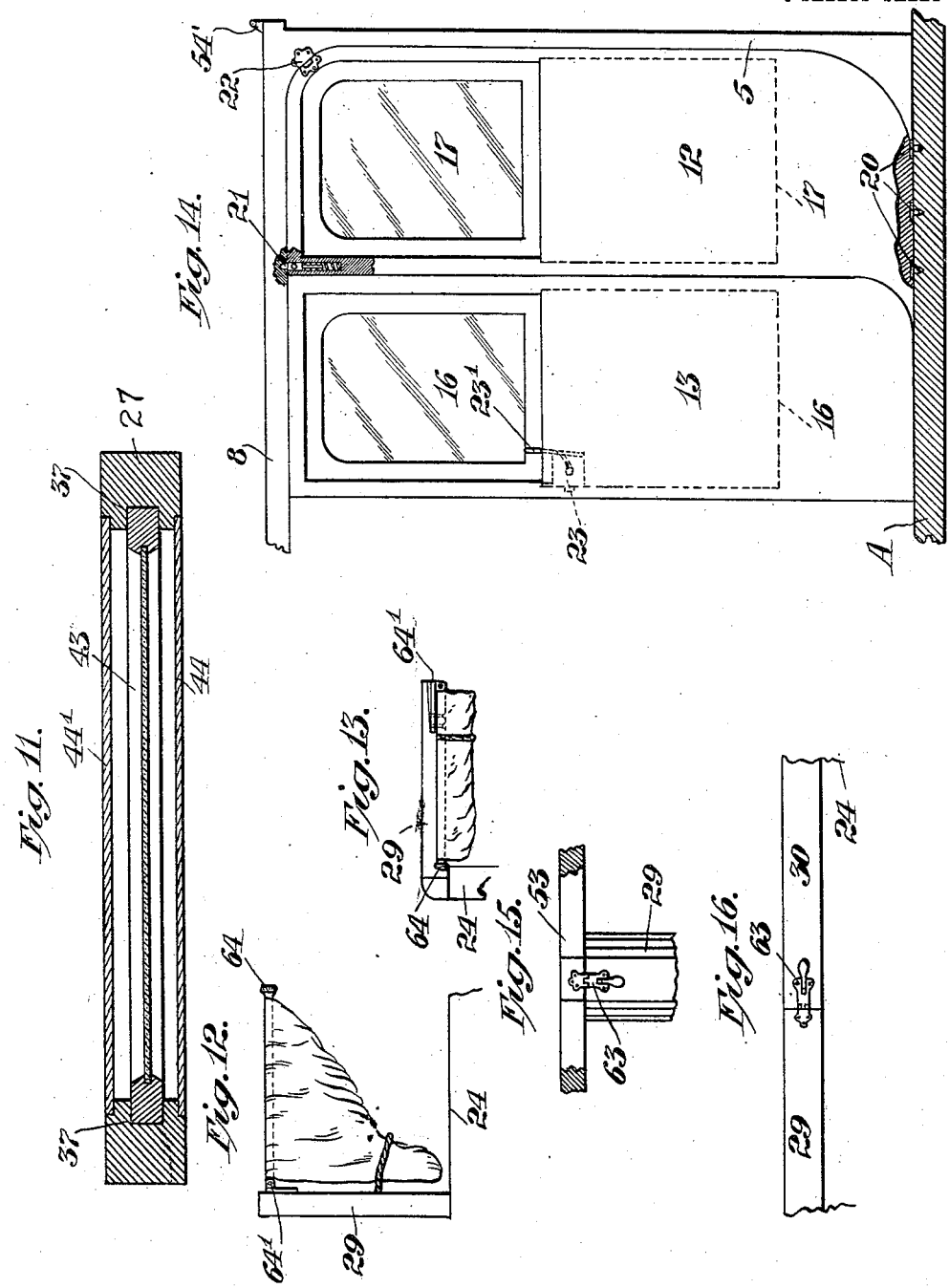

W. I. TWOMBLY.
COMBINATION CONVERTIBLE VEHICLE BODY.
APPLICATION FILED MAR. 4, 1910.
992,298.
Patented May 16, 1911.
9 SHEETS—SHEET 9.
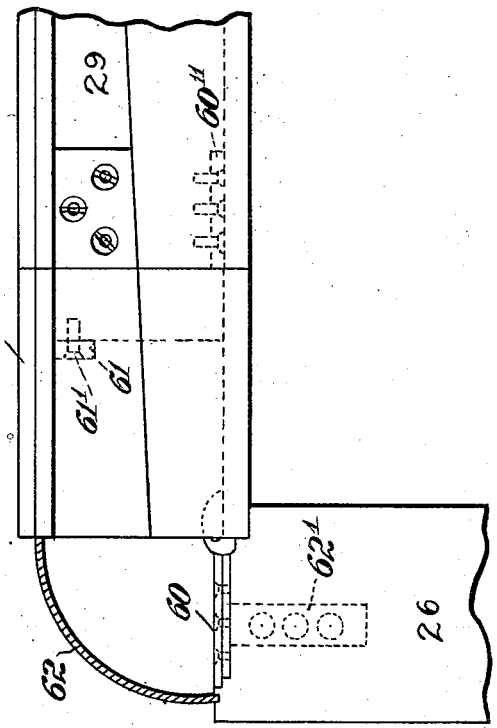
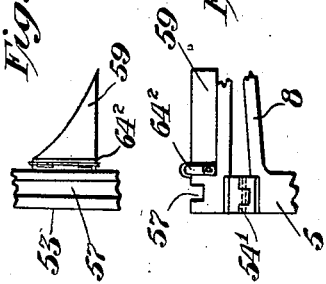
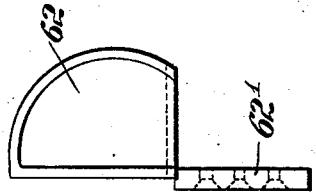
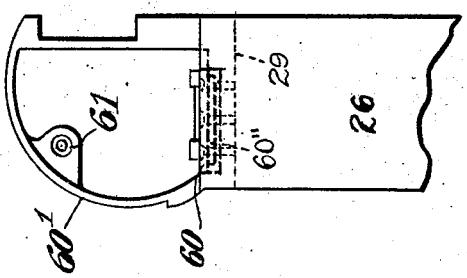
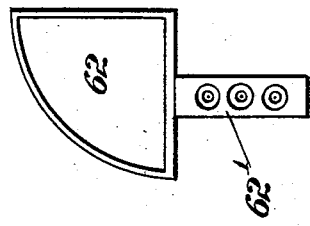
WITNESSES:
INVENTOR
Willard I. Twombly
BY
ATTORNEY

UNITED STATES PATENT OFFICE.

WILLARD I. TWOMBLY, OF NEW YORK, N. Y., ASSIGNOR, BY MESNE ASSIGNMENTS, TO TWOMBLY MOTORS COMPANY, OF NEW YORK, N. Y., A CORPORATION OF NEW YORK.

COMBINATION CONVERTIBLE VEHICLE-BODY.

992,298. Specification of Letters Patent. Patented May 16, 1911.

Application filed March 4, 1910. Serial No. 547,207.

*To all whom it may concern:*

Be it known that I, WILLARD I. TWOMBLY, a citizen of the United States, residing in the borough of Manhattan, in the city, county, and State of New York, have invented a new and useful Improvement in Combination Convertible Vehicle-Bodies, of which the following is a specification.

This invention relates to vehicle bodies, and it is the object of the invention to provide a combination convertible vehicle body which may be readily converted from an entirely closed to a partly or entirely open body, and as readily re-converted into an entirely closed body.

It is a further object of the invention to provide a vehicle body comprising two compartments, the front one for the driver and the other for passengers, either one or both of which may be converted from an entirely closed to a partly or entirely open compartment, and vice versa.

In the drawings accompanying and forming a part of this specification, Figure 1 is a side elevation illustrating the body as a closed and integral one. Fig. 2 is a side elevation, the side panels having been removed from the front compartment to convert it into an open structure, and the roof of the rear compartment folded upon itself and the rear roof-supporting pillars folded over the back of the body to convert said rear compartment into a partly open structure. Fig. 3 is a view similar to Fig. 2, but illustrating the roof of the rear compartment as folded over the top of the front compartment, the roof-supporting pillars at the sides and back folded into the body, and the door-window supporting-frame as folded into the door, to convert said compartment, and the entire body, into an entirely open structure. Fig. 4 is an end elevation looking at the back of Fig. 1. Fig. 5 is an end elevation, the parts being in the position illustrated in Fig. 2. Fig. 6 is a front elevation, the parts being in the positions illustrated in Fig. 1. Fig. 7 is a sectional plan view, the roof of the front compartment being removed to illustrate the manner of dropping the windows into the panels and doors in said compartment; one side of the rear compartment illustrating the manner of dropping the windows into the pockets in the body and door, and the other side illustrating the manner of the pillars folding into the body. Fig. 8 is a detail, partly in section, of one of the doors of the rear compartment, the window being shown in dotted lines as dropped into the pocket in the door. Fig. 9 is a fragmentary detail to illustrate the sliding connection between the door and one of its window-supporting pillars. Fig. 10 is a fragmentary detail to illustrate the manner of locking or latching the door-window supporting frame in upright position. Fig. 11 is a sectional view to illustrate the manner of sliding the windows into the pockets in the doors and body. Fig. 12 is a detail to illustrate the manner of securing a foldable curtain bracket to the foldable roof-supporting pillars. Fig. 13 is a view similar to Fig. 12, but showing the positions the curtain-bracket and curtain assume when the pillar is folded into the body. Fig. 14 is a detail showing the manner of fastening the panels in the front compartment, and showing in dotted lines the positions the windows assume when dropped into the pockets. Fig. 15 is a detail to illustrate the manner of locking the foldable roof section to the foldable pillars. Fig. 16 is a detail of one manner of locking the foldable pillars when in folded position. Fig. 17 is a detail of a sleeve forming a part of the rear roof-supporting pillar hinge. Fig. 18 is a view of the hinge sleeve looking at the left of Fig. 17. Fig. 19 is a detail showing the manner of hinging the filler piece in the side of the body to the foldable roof, and the position it assumes when the roof is folded. Fig. 20 is a detail of the hinge of the rear roof-supporting pillars, the parts being in the position they assume when the pillars are folded, and the sleeve illustrated in Figs. 17 and 18 shown in section. Fig. 21 is a view looking at the right of Fig. 20, the pillar sleeve being removed. Fig. 22 is a plan of the parts shown in Fig. 19; and Fig. 23 is a sectional side elevation taken on the line X—X of Fig. 3 looking in the direction of the arrows.

Similar characters of reference designate like parts throughout the different views of the drawings.

In the drawings I have illustrated one form of my invention, and as comprising a vehicle having two compartments, the floor (designated in a general way by A) of which is common to both, a pair of sills 2 and 3 constituting a part of said floor whereby to secure the body to the running gear of the vehicle.

Constructed integral with the floor and forming a part of the front compartment are rigid roof-supporting pillars 4, 5, 6 and 7, a rigid roof 8 being secured to said pillars and extending over the front compartment to form the roof thereof. The lower portion of the front of said compartment comprises a dash-board 9, and the upper portion an adjustable window 10, said window secured in any suitable manner, as by hinges 11, so that it may be folded and locked up against the inside of the roof 8. The sides of said compartment comprise removable panels 12, hinged doors 13 forming a part thereof; said doors and panels have pockets 14, 15 in the lower portions and are provided with removable or drop windows 16, 17, which may be dropped into the pockets 14, 15. The pockets 14, 15 in the panels and doors are of the usual construction, a panel secured to the outside of the framework constituting the outer wall and a panel secured to the inside forming the inner wall.

The panels 12 may be secured in any suitable manner. In the present instance I have shown them provided with dowels 20 at the bottom to engage in sockets in the floor A; at the top a releasable bolt 21 engages in the rigid roof 8, and a latch 22 having an eccentric bolt to draw the panel securely in place. The doors have the usual spring lock 23 having a handle to open it from the outside, and a hand-piece 23′ for opening it from the inside.

The rear compartment comprises an integral back 24 and sides 25, 26, doors 27, 28 being hinged to said sides and when closed forming a continuation thereof. At the back of the body are foldable roof-supporting pillars 29, 30 secured thereto by suitable hinges, to be fully described hereinafter. At the sides are hinged foldable roof-supporting pillars 32, 32′. The said pillars 29, 30, 32, 32′ constitute window-supporting frames, and for this purpose are provided with grooves 33, 33′ in which are mounted for sliding movement windows 34, 34′. The sides and back are constructed with pockets 35 therein, said pockets formed by means of a panel 36 secured to and constituting the inside of the framework of the body, and a panel 36′ secured to the outside of the framework to form the outside wall. The framework is so constructed as to form slideways 37 therein for the windows, a rail 38 extending across the bottom of the pocket upon which the windows rest when dropped into said pockets, as clearly illustrated in detail in Fig. 23. As the pockets in the back and sides are constructed substantially similar for convenience I have described the construction of one pocket only.

The doors 27, 28 have a foldable or collapsible window carrying frame, comprising an upright 39 which has a sliding joint connection 40 with the doors, and adapted to be folded down over the top thereof, the lower end 41 thereof when folded down being flush with the edge of the door, and the upper end 41′ breaking joints with the bottom of the rail 32. The other upright 40′ is hinged to the door, and adapted to fold inside thereof as clearly shown in Fig. 7. The said uprights 39, 40′ have slideways 42, 42′ for supporting a removable or drop window 43. In the doors are pockets similar to the pockets in the back and sides, and comprise a panel 44 for the outside, and a panel 44′ for the inside, both of which are secured to the framework, slideways 37, (similar to the slideways in the back and sides) also being provided for the window frame 43, and a rail 43′ upon which the window rests when dropped into said pocket, as clearly shown in Figs. 8 and 11.

For retaining the upright 40′ in upright position, I provide a slot 45 in the lower end thereof, and secure therein a spring latch 46, the free end of which is hook shaped to engage in a recess 46′ in the usual window fence running along the top of the lower door section. The latches are released by means of a finger-piece 48 (see Fig. 10). The slide-joint connection between the upright 39 and door comprises a pintle 49 engaging in a slot 49′ in the window fence 47 and an ear 47′ secured to the top of the lower door section. As a further means for retaining the upright 40′ in upright position a dowel 50 in the lower door section engages in a socket in the lower end of said upright, as shown in Fig. 8, the said dowel also serving as a positioning means for the upright 39 when in folded position by engaging in a socket 50′ therein. The door has a locking bolt 51 of usual construction having a handle 51′ for opening it from the outside, and a hand-piece 52 to permit opening from the inside. (Figs. 8 and 9.) As both of the doors are constructed substantially the same, a description of one will suffice for both.

The roof over the rear compartment comprises a plurality of hinged sections 53, 53′ the section 53′ being secured to the rigid roof 8 by means of hinges 54′, to be more fully described hereinafter, and the section 53 secured to the section 53′ by hinges 54.

In normal position the hinged sections rest upon the foldable pillars 29, 30, 32, and 32', and positioned by means of dowels, although any other suitable means may be used for this purpose. A dowel 55 in the rear pillar 30 engages with a socket 55' in the roof section 53, said roof section being also provided with a dowel 56 to engage in a socket 56' in the pillar 29. The dowel 55 in the pillar 30 also engages in the socket 56' in the pillar 29 when folded down to retain said pillars in folded position. The roof section 53, 53' also have window-receiving grooves 57 in which the upper ends of the windows engage when the body is in normal closed position. The rear compartment is also provided with the usual upholstered seat, designated in a general way by D. The front compartment also has a seat, designated in a general way by E, and a foot rest 58.

The partition between the front and rear compartments I have illustrated as comprising a rigid lower portion 65 having a pocket therein similar to the pockets in the body proper. In the upper portion of said partition is a removable or drop window, or panel, 66 which may be dropped into said pocket. I have shown this partition as being of a convertible structure, but it will be obvious that the same may be constructed integral.

In Fig. 1 I have illustrated in side elevation the body as it will appear as an entirely and rigidly closed structure. Should it be desired to convert the front compartment into an open structure, it is only necessary to release the bolts 21, 22 and lift the dowels 20 out of the sockets in the floor when the side panels may be readily removed. However, should it be desired to convert said compartment into a partly open structure, the windows 16, 17 may be readily slid into the pockets in the doors 13 and panels 12.

In Fig. 2 the front compartment is shown as having been converted into an open, and the rear compartment into a partly open, structure. This is accomplished by dropping the windows into the pockets in the back and sides of the body, releasing the latches 63, and folding the roof section 53 upon the roof section 53'; the rear pillars 29, 30 being folded over the back of the body, and locked by the latches 63. (Fig. 16.) The said folded pillars give to the back of the body a finished appearance. Any suitable means may be provided for securing the roof section 53 in folded position. The side pillars 32, 32' are so constructed as to conform when folded down to the top of the sides of the body, and owing to such conformation when in roof-supporting position there is a space left between said pillars and roof. To provide for this I hinge to the roof section 53' a filler piece 59, said filler piece folding into the roof when in open position. It will be noted that the roof is of concaved construction, and to permit of the foldable roof sections folding upon themselves and over the roof of the front compartment, it is necessary that the axes of the hinges be in one plane. For this purpose the leaves of the hinges are constructed with a bevel surface to set flatly upon the roof, and the ears are made of varying lengths to compensate for the difference in height between the outside edges and the middle of the roof. The hinges for securing the rear pillars to the body are of substantially similar construction, and comprise a leaf member 60 which is secured to the body as by means of screws, the other member being in the form of a sleeve portion 60' into which the pillar sets, said sleeve having lugs 60'' whereby the pillar is secured in place, as by means of screws. Inside of the sleeve portion 60' is an ear 61, in which engages a screw 61' for drawing the pillar down into said sleeve portion. An elbow sleeve or filler-piece 62 has a lug 62', whereby it is secured to the body over the leaf 60 of the hinge, and when the pillar is in roof-supporting position said sleeve 62 engages within the portion 60' of the hinge, and when it is folded over the back of the body the said sleeve 62 forms a finished corner for the rails for the back and sides of the body, as clearly shown in Fig. 20. For securing the roof and pillars I provide an eccentric latch 63 of usual construction, said latch also serving to lock the pillars in folded position, as is clearly shown in Figs. 15 and 16. As this latch is common to all pillars, for the purpose of the present case I have only illustrated it in connection with one. Secured to the rear roof-supporting pillars 29, 30 is a curtain-supporting bracket 64 (Fig. 12), said bracket held in open position by means of a spring latch 64'; the supporting bracket 64 and curtain, when the pillars 29, 30 are in folded position, assuming substantially the position illustrated in Fig. 13.

In Fig. 3 I have illustrated the body as having been converted into an entirely open structure. The panels in the front compartment are removed, the windows in the rear compartments dropped into the pockets in the sides and back of the body, and the door-windows dropped into the pockets in the doors; the foldable roof sections 53, 53' having been folded over the rigid roof 8 of the front compartment, and secured in any suitable manner. The rear roof-supporting pillars 29, 30 are folded over the back of the body and secured by the latches 63, the same as when converting the body into a partly open structure, and the side roof-supporting pillars 32, 32' folded over the sides of the body, the tops breaking joints with the back of the body and the rear roof-supporting pillars. The upright 40' of the doors are folded down inside of the doors, and the uprights 39 folding over the top of the lower door sections, the sliding-joint connection permitting the sliding of said uprights so that the bottom thereof will be flush with the edge of the doors, and the tops will break joints with the bottom of the roof-supporting pillars 32, 32', the said uprights 39, 40' and pillars 32, 32' and 29, 30 constituting in connection with the hinges for the rear pillars 29, 30 a continuous and finished rail for the top of the vehicle body proper when converted into an open structure. The filler pieces 59 have a sliding joint connection 64² with the hinged roof section 53', and when the rear compartment is converted into an entirely open structure, and the roof folded as illustrated in Fig. 3, the said filler pieces 59 will fall into the roof as shown in Fig. 19.

It will be obvious that in re-converting either one or both of the compartments from an entirely open to a partly or entirely closed structure the operations are the reverse to those of converting the body from an entirely closed to a partly or entirely open structure, and a detailed description of said operations is, therefore, not deemed necessary.

While I have shown one form of the invention in the drawings as comprising a front and a rear compartment, either one or both of which may be converted from a closed to a partly or entirely open structure, and vice versa, it will be readily understood that the body may be constructed with only one convertible compartment, and for this purpose be provided with only one pair of rigid roof-supporting pillars 5, 7, the rigid roof 8 being secured thereto and in the form of a hood extending over the seat of the driver, the hinged sections 53, 53' of the foldable roof capable of being folded upon each other and over the rigid hood when converting said compartment into an open structure. Furthermore, the roof-supporting pillars 4, 5, 6, and 7 may be constructed in sections to be rigidly secured together; and the roof of both the compartments and the foldable roof-supporting frame of the rear compartment capable of being entirely removed, so that the body may be changed from a body having a closed and convertible top or "winter" vehicle body, to an entirely open structure or "summer" vehicle body. The compartments may also be provided with any suitable foldable or adjustable seats, and in the present instance comprise seat portions 70, 71 and 72 hinged to the lower portion 65 of the partition between the two compartments, and provided with telescoping supports 73, 74 and 75, one member of which has a pivoted connection with the bottom of the seat and the other member with the floor. I have illustrated these seats in Fig. 7 in full lines in their folded positions, and in dotted lines in open or normal positions.

Having thus described my invention, I claim:

1. In a vehicle body, the combination with a body provided with an integral back and sides with window receiving pockets therein, and doors having a collapsible window-carrying frame, of a two-part roof, one part fixed and the other part consisting of a series of hinged sections foldable upon itself and over the fixed roof; foldable roof supporting and window carrying pillars at the sides and back to fold over the top of the sides and back of the body to form a continuous and finished rail for the top of the body; drop windows carried by said pillars which may be dropped into the pockets in the back and sides; hinges to secure said pillars to the body, the hinges for the rear pillars comprising a pair of pivotally connected members, one in the form of a leaf secured to the body, the other member consisting of a sleeve portion in which the bottom of the pillar engages and is secured.

2. In a vehicle body, the combination with a body provided with an integral back and sides with window receiving pockets therein, and doors having a collapsible window-carrying frame, of a two-part roof, one part fixed and the other part consisting of a series of hinged sections foldable upon itself and over the fixed roof; foldable roof supporting and window-carrying pillars at the sides and back to fold over the top of the sides and back of the body to form a continuous and finished rail for the top of the body; drop windows carried by said pillars which may be dropped into the pockets in the back and sides, hinges to secure said pillars to the body, the hinges for the rear pillars comprising a pair of pivotally connected members, one in the form of a leaf secured to the body, the other member consisting of a sleeve portion in which the bottom of the pillar engages and is secured; said sleeve portion having an ear or lug projecting laterally from the inner wall and having an opening for the passage of a screw to engage with the pillar and draw it into said sleeve, and also having a pair of projections to engage at opposite sides of the pillar to brace the latter.

3. In a vehicle body, the combination with a body provided with an integral back and sides with window-receiving pockets therein, and doors having a collapsible window-carrying frame, of a two-part roof, one part fixed and the other part consisting of a series of hinged sections foldable upon itself and over the fixed roof; foldable roof supporting and window-carrying pillars at the sides and back to fold over the top of the sides and back of the body to form a continuous and finished rail for the top of the body; drop windows carried by said pillars which may be dropped into the pockets in the back and sides; hinges to secure said pillars to the body, the hinges for the rear pillars comprising a pair of pivotally connected members, one in the form of a leaf secured to the body, the other member consisting of a sleeve portion in which the bottom of the pillar engages and is secured; and an elbow sleeve having a lug whereby it is secured to the body over the leaf member of the hinge, said sleeve engaging in the sleeve portion of the hinge when the pillar is in roof-supporting position and serving as a filler piece when the pillar is folded down to form a finished corner between the bottom of the pillar and body.

4. In a vehicle body, the combination with a body provided with an integral back and sides with window receiving pockets therein, and doors having a collapsible window-carrying frame, of a two part roof, one part fixed and the other part consisting of a series of hinged sections foldable upon itself and over the fixed roof; foldable roof-supporting and window-carrying pillars at the sides and back, the rear pillars folding over the back of the body to form a continuous and finished rail for the top thereof; drop windows carried by said pillars which may be dropped into the pockets in the back and sides; hinges to secure said pillars to the body; the hinges for the rear pillars comprising a pair of pivotally connected members one in the form of a leaf secured to the body, the other member consisting of a sleeve portion in which the bottom of the pillar engages and is secured; a dowel pin in the top of one of the pillars and a socket in the top of the other pillar in which said dowel engages when the pilars are folded down; and means to lock the pillars in folded position and to also lock the pillars and roof together when in roof supporting position comprising an eccentric latch one part of which is carried by each pillar, and coöperating latch mechanism carried by the roof.

5. In a vehicle body, the combination with a body having an integral back and sides with window-receiving pockets therein, and doors having a collapsible window-carrying frame, of a two-part roof, one part fixed and the other part consisting of a series of hinged sections foldable upon itself and over the fixed roof, foldable roof-supporting and window carrying pillars at the sides and back to fold over the top of the sides and back of the body to form a continuous and finished rail for the top of the body; hinges to secure said pillars to the body; drop windows carried by said pillars which may be dropped into the pockets in the back and sides; a dowel pin in the top of one of the pillars and a socket in the top of the other pillar in which said dowel engages when the pillars are folded down, the dowel in the one pillar engaging in a socket in the hinged section of the roof, and a dowel in said roof section engaging in the socket in the other pillar when the pillars are in roof-supporting position to form an integral and rigid connection between the roof and pillars.

6. In a vehicle body, the combination with a body having an integral back and sides with window-receiving pockets therein, and doors having a collapsible window-carrying frame, of a two-part roof, one part fixed and the other part consisting of a series of hinged sections foldable upon itself and over the fixed roof; foldable roof-supporting and window-carrying pillars at the sides and back to fold over the top of the sides and back of the body to form a continuous and finished rail for the top of the body; hinges to secure said pillars to the body; drop windows carried by said pillars which may be dropped into the pockets in the back and sides; a dowel pin in the top of one of the pillars and a socket in the top of the other pillar in which said dowel engages when the pillars are folded down, the dowel in the one pillar engaging in a socket in the hinged section of the roof, and a dowel in said roof section engaging in the socket in the other pillar when the pillars are in roof-supporting position to form an integral and rigid connection between the roof and pillars; and a latch one member of which is carried by each pillar to lock the pillars in folded position.

7. In a vehicle body, the combination with a body having an integral back and sides with window-receiving pockets therein, and doors having a collapsible window-carrying frame, of a two-part roof, one part fixed and the other part consisting of a series of hinged sections foldable upon itself and over the fixed roof; foldable roof-supporting and window-carrying pillars at the sides and back to fold over the top of the sides and back of the body to form a continuous and finished rail for the top of the body; hinges to secure said pillars to the body; drop windows carried by said pillars which may be dropped into the pockets in the back and sides; a dowel pin in the top of one of the pillars and a socket in the top of the other pillar in which said dowel engages when the pillars are folded down, the dowel in the one pillar engaging in a socket in the hinged section of the roof, and a dowel in said roof section engaging in the socket in the other pillar when the pillars are in roof-supporting position to form an integral and rigid connection between the roof and pillars; and a latch one member of which is carried by each pillar to lock the pillars in folded position; said latch members also coöperating with latch members connected to the roof to lock the roof and pillars together when the latter are in roof-supporting position.

8. In a vehicle body, the combination with a body having an integral back and sides with window-receiving pockets therein, and doors having a collapsible window-carrying frame, of a two-part roof, one part fixed and the other part consisting of a series of hinged sections foldable upon itself and over the fixed roof, foldable roof-supporting and window-carrying pillars at the sides and back of the body; drop windows carried by said pillars which may be dropped into the pockets in the back and sides; hinges to secure said pillars to the body, the hinges for the rear pillars comprising a pair of pivotally connected members, one member in the form of a leaf secured to the body, the other member consisting of a sleeve portion in which the bottom of the pillar engages and is secured, said sleeve portion having an ear or lug projecting laterally from the inner wall and having an opening for the passage of a screw to engage with the pillar and draw it into said sleeve, and also having a pair of projections to engage at opposite sides of the pillar to brace the latter; an elbow sleeve having a lug whereby it is secured to the body over the leaf member of the hinge, said sleeve engaging in the sleeve portion of the hinge when the pillar is in roof-supporting position and serving as a filler piece when the pillar is folded down to form a finished corner between the bottom of the pillar and body; a dowel pin in the top of the pillars and a socket in the top of the other pillar in which said dowel engages when the pillars are folded down, the dowel in the one pillar also adapted to engage in a socket in the hinged section of the roof, and a dowel in said roof section engaging in the socket in the other pillar when the pillars are in roof-supporting position; and a latch, one member of which is carried by each pillar to lock the pillars in folded position, said latch members also coöperating with latch members connected to the roof to lock the roof and pillars together when the latter are in roof-supporting position.

9. In a vehicle body, the combination of a foldable roof and roof-supporting and window-carrying pillars at and foldable over the top of the sides and back of the body; a hinge for the rear pillars comprising a pair of pivotally connected members, one member in the form of a leaf secured to the body, and the other member in the form of a sleeve in which the bottom of the pillar is mounted; and an elbow sleeve fixed to the body over the leaf member, said elbow sleeve adapted to engage in the sleeve portion of the hinge when the pillars are in roof-supporting position and serving as a filler when the pillars are folded down to form a finished corner between the bottom of the folded pillars and body.

10. In a vehicle body having a convertible top, the combination of a foldable roof and roof-supporting and window-carrying pillars at, and foldable over the top of, the back and sides of the body; hinges for the rear pillars comprising a pair of pivotally connected members, one member in the form of a leaf secured to the body and the other member in the form of a sleeve in which the bottom of the pillar is mounted; an elbow sleeve fixed to the body over the leaf member, said elbow sleeve adapted to engage in the sleeve portion of the hinge when the pillars are in roof-supporting position and serving as a filler when the pillars are folded down to make a finished corner between the bottom of the folded pillars and body; curtain brackets connected to the rear pillars and adapted to be folded into said pillars; and spring latches for maintaining said curtain brackets in open position.

11. In a vehicle body, the combination with a body provided with an integral back and sides with window-receiving pockets therein, and doors having a collapsible window-carrying frame, of a two-part roof, one part fixed and the other part consisting of a series of hinged sections foldable upon itself and over the fixed roof; foldable roof-supporting and window-carrying pillars at the rear corners to fold over the top of the back of the body to form a continuous and finished rail for the top thereof; foldable roof-supporting and window-carrying pillars hinged to the sides of the body; and drop windows carried by said side and rear pillars which may be dropped into the pockets in the back and sides of the body.

12. In a vehicle body, the combination with a body provided with an integral back and sides with window-receiving pockets therein, and doors having a collapsible window-carrying frame, of a two-part roof, one part fixed and the other part consisting of a series of hinged sections foldable upon itself and over the fixed roof; foldable roof-supporting and window-carrying pillars at the rear corners to fold over the top of the back of the body to form a continuous and finished rail for the top thereof; foldable roof-supporting and window-carrying pillars hinged to the sides of the body; drop windows carried by said side and rear pillars which may be dropped into the pockets in the back and sides of the body; and hinges for the rear pillars comprising a pair of pivotally connected members and a fixed member adapted to engage in one of the pivotally connected members when the pillars are in roof-supporting position and to fill the space between the bottom of the pillars and the body when the pillars are folded down to form a finished corner between the bottom of said pillars and the body.

WILLARD I. TWOMBLY.

Witnesses:
PAULA PHILIPP,
JOHN O. SEIFERT.